(12) United States Patent
Quesada Barbero et al.

(10) Patent No.: US 12,502,807 B2
(45) Date of Patent: Dec. 23, 2025

(54) CUTTING DEVICE FOR MANUAL CERAMIC-CUTTING MACHINES

(71) Applicant: GERMANS BOADA, S.A., Rubi (ES)

(72) Inventors: Juan Antonio Quesada Barbero, Rubi (ES); David Martinez Galindo, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 264 days.

(21) Appl. No.: 18/260,157

(22) PCT Filed: Nov. 12, 2021

(86) PCT No.: PCT/ES2021/070817
§ 371 (c)(1),
(2) Date: Jun. 30, 2023

(87) PCT Pub. No.: WO2023/084132
PCT Pub. Date: May 19, 2023

(65) Prior Publication Data
US 2024/0066755 A1    Feb. 29, 2024

(51) Int. Cl.
*B28D 1/22*    (2006.01)

(52) U.S. Cl.
CPC .................... *B28D 1/225* (2013.01)

(58) Field of Classification Search
CPC ........ B28D 1/225; B28D 1/24; B28D 5/0011; B28D 5/0058; B28D 7/00; B23B 2231/2097; Y10T 403/32451
See application file for complete search history.

(56) References Cited

U.S. PATENT DOCUMENTS

| 185,004 | A | * | 12/1876 | White | ............... | F16M 11/12 |
| | | | | | | 248/408 |
| 1,179,706 | A | * | 4/1916 | Doerr | ................. | B43L 9/04 |
| | | | | | | 33/27.03 |

(Continued)

FOREIGN PATENT DOCUMENTS

| ES | 1047002 | 2/2001 |
| ES | 2200480 | 3/2004 |

(Continued)

OTHER PUBLICATIONS

GB_2349845_A (Year: 2000).*
WIPO, International Search Report for PCT/ES2021/070817, Aug. 9, 2022.

*Primary Examiner* — Jonathan G Riley
(74) *Attorney, Agent, or Firm* — Hodgson Russ LLP

(57) ABSTRACT

The invention relates to a cutting device for manual ceramic-cutting machines, which comprises a support (1) provided with: a vertical hole (11) that receives a first end of a bar (21) of a cutting tool (2), the front face (26) of said bar being provided with at least one row of recesses (27) spaced apart vertically; and a horizontal hole (12) that receives a handle (3) and a stem (4) capable of moving longitudinally between a front position for locking the cutting tool (2) and a rear position for releasing the cutting tool; the stem (4) comprising, at its front end, at least one projection (42) which, in the front position for locking the cutting tool, is accommodated in one of the recesses (27) on the front face (26) of the bar (21) of the cutting tool (2).

8 Claims, 5 Drawing Sheets

(56) References Cited

U.S. PATENT DOCUMENTS

| | | | | |
|---|---|---|---|---|
| 1,579,995 | A * | 4/1926 | Aubuchont | B26D 7/2635 83/886 |
| 1,750,718 | A * | 3/1930 | Lenston | B26D 7/2635 83/886 |
| 1,995,741 | A * | 3/1935 | Granite | B28D 1/225 125/23.02 |
| 2,529,735 | A * | 11/1950 | Martin | C03B 33/12 30/164.95 |
| 2,582,078 | A * | 1/1952 | Solum | C03B 33/14 33/21.1 |
| 3,280,677 | A * | 10/1966 | Grzymislawski | C03B 33/10 83/881 |
| 3,399,586 | A * | 9/1968 | Insolio | C03B 33/10 83/881 |
| 3,459,078 | A * | 8/1969 | Black | B26D 7/2635 83/881 |
| 4,165,854 | A * | 8/1979 | Duly | A47C 3/34 403/324 |
| 4,228,711 | A * | 10/1980 | Insolio | C03B 33/10 83/578 |
| 4,672,874 | A * | 6/1987 | Gach | C03B 33/12 83/881 |
| 4,770,156 | A * | 9/1988 | Boada Sucarrats | B28D 1/225 125/23.01 |
| 5,040,445 | A * | 8/1991 | Liou | B28D 1/225 83/886 |
| 5,381,713 | A * | 1/1995 | Smith | C03B 33/10 83/881 |
| 5,560,274 | A * | 10/1996 | Turner | B28D 1/225 83/886 |
| 6,164,272 | A * | 12/2000 | Fouy | B28D 1/225 125/35 |
| 6,269,994 | B1 * | 8/2001 | Harrington | B28D 1/225 225/96 |
| 7,013,785 | B2 * | 3/2006 | Torrents I Comas | B28D 1/225 83/676 |
| 7,198,306 | B2 * | 4/2007 | Ambs | F16B 5/02 411/407 |
| 8,375,932 | B2 * | 2/2013 | Comas | B28D 1/225 125/23.02 |
| 10,252,932 | B2 * | 4/2019 | Valiani | B26D 5/00 |
| 2004/0025662 | A1 * | 2/2004 | Torrents I Comas | B28D 1/225 83/886 |
| 2014/0238376 | A1 * | 8/2014 | Courtemanche | B28D 1/225 125/23.01 |
| 2018/0290335 | A1 * | 10/2018 | Rosello Gargallo | B28D 1/225 |
| 2018/0297237 | A1 * | 10/2018 | Guàrdia | B28D 1/225 |
| 2019/0193300 | A1 * | 6/2019 | Sarmiento | B28D 1/228 |
| 2020/0158150 | A1 * | 5/2020 | Su | F16B 5/0208 |
| 2024/0066755 | A1 * | 2/2024 | Quesada Barbero | B28D 1/225 |

FOREIGN PATENT DOCUMENTS

| | | | | |
|---|---|---|---|---|
| ES | | 2365909 | | 10/2011 |
| ES | | 2537224 | | 6/2015 |
| GB | | 2349845 A | * 11/2000 | B28D 1/225 |

\* cited by examiner

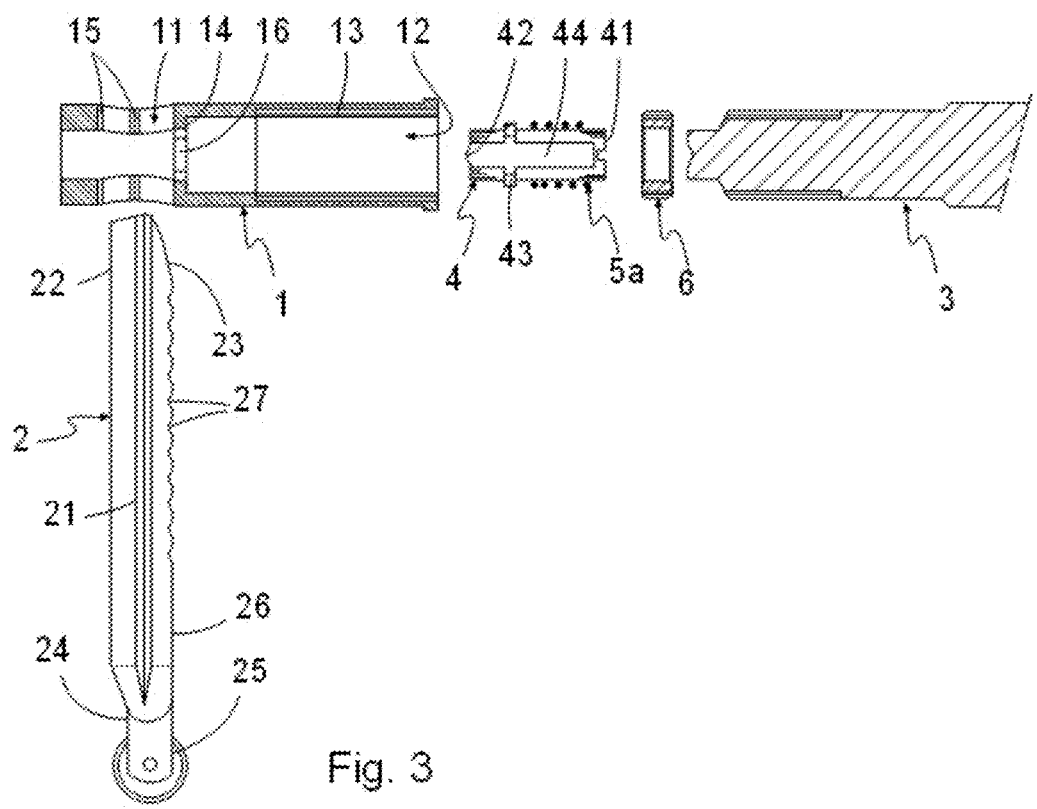
Fig. 3
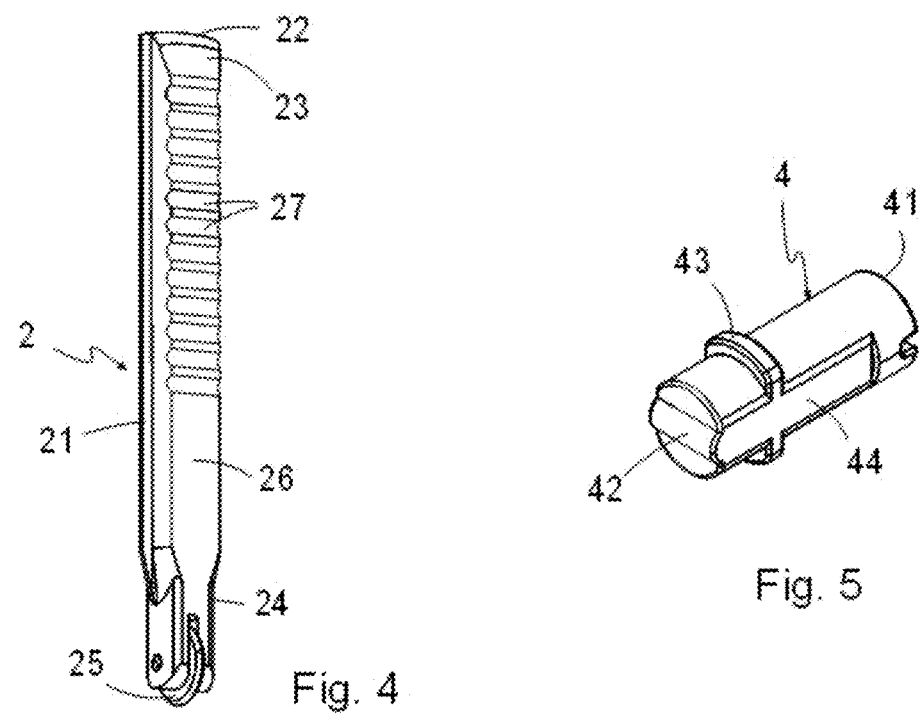
Fig. 4
Fig. 5

CUTTING DEVICE FOR MANUAL CERAMIC-CUTTING MACHINES

CROSS-REFERENCE TO RELATED APPLICATION

This application is a U.S. national stage entry of International Application No. PCT/ES2021/070817, filed Nov. 12, 2021, the entire disclosure of which is incorporated herein by reference.

FIELD

The present invention can be used in manual machines for cutting ceramic pieces, such as slabs, tiles and the like.

BACKGROUND

Manual machines for cutting ceramic pieces are currently known, which comprise a base for supporting the piece to be cut; and longitudinal guides on which a longitudinally movable runner is mounted and which, in turn, receives a cutting device capable of rotating about a horizontal shaft, perpendicular to said guides.

Said device comprises a support provided with a vertical hole for mounting a cutting tool and a horizontal threaded hole that receives a handle for fixing the cutting tool and for actuating same both in the rotation motion and the longitudinal movement.

The cutting tool comprises a bar provided with a first end that is inserted into the vertical hole of the support and a second end that receives a cutting wheel for marking a break line on the ceramic pieces.

The bar of the cutting tools, generally having a circular cross-section, has a smooth front face, and at least one longitudinal, lateral or rear slot, which receives inside a respective anti-rotation appendage defined in the vertical hole of the support when the cutting tool is mounted on the support.

In patent ES 2 365 909 T3 of the same owner of the present invention, a cutting device of the aforementioned type is described and represented, wherein the bar of the cutting tool comprises a flat front face, two longitudinal slots on its opposite sides and a longitudinal slot on its rear face.

The applicant has found that these cutting devices exhibit a number of drawbacks related to the mounting of the cutting tool on the support and to the immobilisation of said cutting tool in the mounting position.

Another drawback is that during mounting, the cutting tool must be placed at a suitable height so that when the handle, which acts as a lever, is lowered, the cutting wheel makes contact with the ceramic piece to be cut. During said mounting, the user must hold the cutting tool with one hand and rotate the handle with the other hand so that it is threaded mounted into the horizontal hole of the support and presses with its front end the flat front face of the bar of the cutting tool.

Once tightening is carried out, it must be checked that the cutting tool is at the appropriate height; otherwise, the handle must be loosened while holding the cutting tool with the hand so that it is not dropped, since the pressure of the handle has been released, and reposition it intuitively at a different height; repeating these operations of loosening the handle, repositioning the cutting tool and tightening the handle, every time the height position of the cutting tool is to be modified, while holding the tool with the hand. This operation is slow and cumbersome.

Another drawback is that once the cutting tool is tightened with the handle, a slight involuntary rotation of the handle in the direction of loosening can occur during the handling of the cutting machine, with the consequent reduction in the tightening force of the cutting tool by means of the handle and the involuntary change of the height position of said cutting tool. This change in position of the cutting tool occurs when the cutting wheel is pressed against the ceramic piece to mark the cutting line on said ceramic piece.

Therefore, the technical problem that arises is the development of a cutting device for manual ceramic-cutting machines, which facilitates the mounting, change of position and fixation of the cutting tool with respect to the support incapable of slipping.

SUMMARY

The cutting device for ceramic-cutting machines object of this invention exhibits a number of technical features that provide a series of advantages with respect to the prior art; specifically:

- It allows the height position of the cutting tool to be modified in a controlled manner, placing it in a series of consecutive and predetermined positions.
- It prevents the cutting tool from slipping in an upward direction with respect to the support when the cutting wheel is pressed against the ceramic piece, so that said cutting tool maintains its position in height even though the tightening force applied thereto is reduced in the transversal direction.
- The cutting tool is not required to be manually held, to prevent same from being dropped, when the handle is loosened to change the position in height of the cutting tool.

This cutting device for manual ceramic-cutting machines is of the type described in the preamble of the main claim and comprises a support provided with: a horizontal hole with at least one threaded rear segment that receives a handle for fixing and actuating the cutting tool, and a vertical hole that receives a cutting tool, which comprises a bar provided with: a first end accommodated through the vertical hole of the support, a second end carrying a cutting wheel for marking a break line in the ceramic pieces to be cut, and a front face facing the aforementioned horizontal hole of the support.

In accordance with the invention, in order to achieve the proposed objectives, this cutting device comprises a stem accommodated in the horizontal hole of the support capable of movement between: a front position for locking the cutting tool, wherein the front end of said stem is accommodated in said vertical hole, and a rear position for releasing the cutting tool.

According to the invention, the bar of the cutting tool comprises on its front face at least one row of recesses spaced apart vertically, and the stem comprises at its front end at least one projection which, in the front position for locking the cutting tool by means of the stem is accommodated in one of the recesses of the front face of the bar of the cutting tool.

Said stem comprises a rear end facing a front end of the handle. Said handle is mounted on the support capable of movement between: a rear position in which said handle is spaced apart from the rear end of the stem and allows its backward movement; and a front position in which said handle acts against the rear end of the stem, preventing its backward movement and fixing same in the front position for locking the cutting tool.

The bar of the cutting tool comprises at its first end a ramp, inclined towards its front face, the function of which is to facilitate its insertion into the vertical hole of the support, acting against the front end of the stem and causing its backward movement.

In the front locking position, the projection defined at the front end of the stem is accommodated in one of the recesses in the bar of the cutting tool, preventing said cutting tool from slipping and changing the position in height when pressing the cutting wheel against the ceramic piece to be cut, even if the tightening force of the stem against the bar of the cutting tool is small.

To lock the cutting tool at the desired height with respect to the support, it is enough to thread the handle into the support until its front end acts against the rear end of the stem, keeping it in the front locking position, uncapable of backward movement.

According to the invention, the stem comprises an intermediate thickening arranged between a front stop of the support and an annular stop, having adjustable position, threaded mounted on the rear threaded segment of the support.

In one embodiment of the invention, the device comprises inside the horizontal hole a spring for pushing the stem towards the front position for locking the cutting tool, said stem exerting continuous pressure against the front face of said bar.

This push spring is mounted between the intermediate thickening of the stem and annular stop threaded mounted in the rear threaded segment of the support.

To change the height position of the cutting tool, it is sufficient to loosen the handle so that it moves towards the rear area and move the cutting tool vertically, since said spring maintains the pressure against the bar of the cutting tool and describes alternative forward and backward movements as its front projection jumps through the successive frontal recesses of the bar of the cutting tool.

During this change in height, the same push of the stem, by the action of the spring, holds the cutting tool making manual holding unnecessary.

In a variant embodiment of the invention, the device comprises, inside the horizontal hole of the support, a spring for pushing the stem towards the rear position for releasing the cutting tool; being required in this case, by means of the handle, to move the stem towards the front position in order to hold and lock the cutting tool with respect to the support.

In this embodiment, the spring for pushing the stem towards the rear position is mounted between the front stop of the support and the intermediate thickening of the stem.

Regardless of the pushing direction of the spring, the annular stop mounted on the rear threaded segment of the horizontal hole of the support comprises an internal hole for longitudinal guidance of the rear end of the stem.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following:

FIG. 3 shows an exploded elevation view of the cutting device of the invention provided with a spring for pushing the stem in the forward direction and cross-sectioned by a vertical plane, with the exception of the cutting tool.

FIG. 4 shows a perspective view of an exemplary embodiment of the cutting tool.

FIG. 5 shows a perspective view of an exemplary embodiment of the stem.

DETAILED DESCRIPTION

Figure 1:
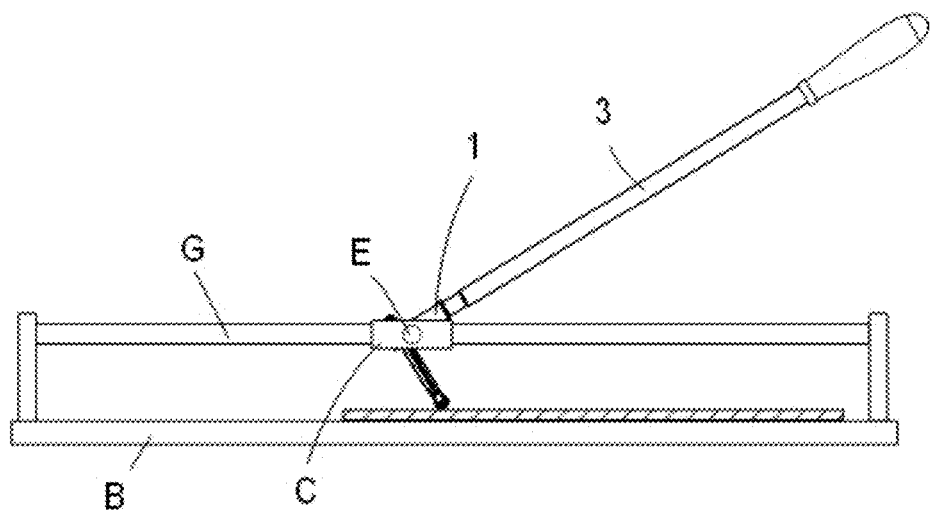
FIG. 1 shows a manual ceramic-cutting machine, carrying the cutting device object of the invention.

FIG. 1 shows the cutting device of the invention mounted by means of a horizontal shaft (E) of rotation on a runner (C) that can be moved along longitudinal guides (G) of a manual ceramic-cutting machine.

Figure 2:
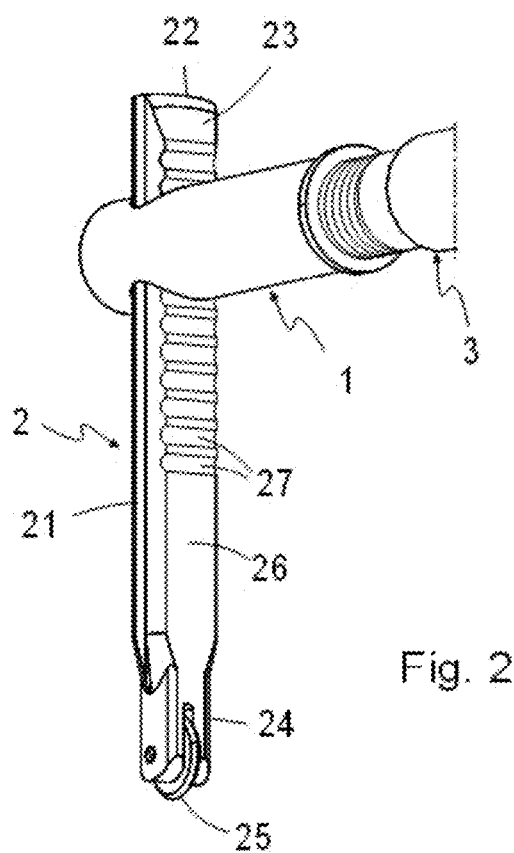
FIG. 2 shows a perspective view of the cutting device of the invention in which the rotation shaft of the support with respect to the runner for longitudinal movement on the guides of the cutting machine has been removed.

FIG. 2 shows the cutting device of the invention isolated and without the horizontal shaft (E) of rotation to simplify the drawing and wherein the support (1) for mounting the cutting tool (2) and the handle (3) for fixing and actuating the cutting tool can be observed.

FIG. 3 shows an exploded view of an exemplary embodiment of the cutting device, showing the different elements that make it up, specifically: the support (1), the cutting tool (2), the handle (3), the stem (4), a spring (5a) for pushing the stem towards a front position, and annular stop (6).

As can be seen in greater detail in FIG. 4, the cutting tool (2) comprises a bar (21) provided with: a first end (22) with a ramp (23) inclined towards a front face (26) of the bar, a second end (24) carrying a cutting wheel (25) for marking a break line in the ceramic pieces and; on its front face (26) a row of recesses (27) spaced apart vertically.

In this specific embodiment, the recesses (27) have a length that coincides with the width of the front face. The bar (21) additionally has longitudinal channels (28) on the lateral and rear faces, shown in FIG. 7, for receiving appendages (15) defined in the vertical hole of the support (1) and their mounting in an angular position determined in said support (1).

As shown in FIG. 3, the support (1) comprises a vertical hole (11) for mounting the cutting tool (2) and a horizontal hole (12) with a threaded rear segment (13) for threaded mounting the annular stop (6) and the front end of the handle (3).

The stem (4) and the spring (5a) for pushing the stem (4) are arranged in front of the annular stop (6).

The stem (4) comprises: a rear end (41) facing the front end of the handle (3) and a front end provided with a projection (42), complementary and couplable to any of the recesses (27) on the front face (26) of the bar of the cutting tool.

Figure 6:
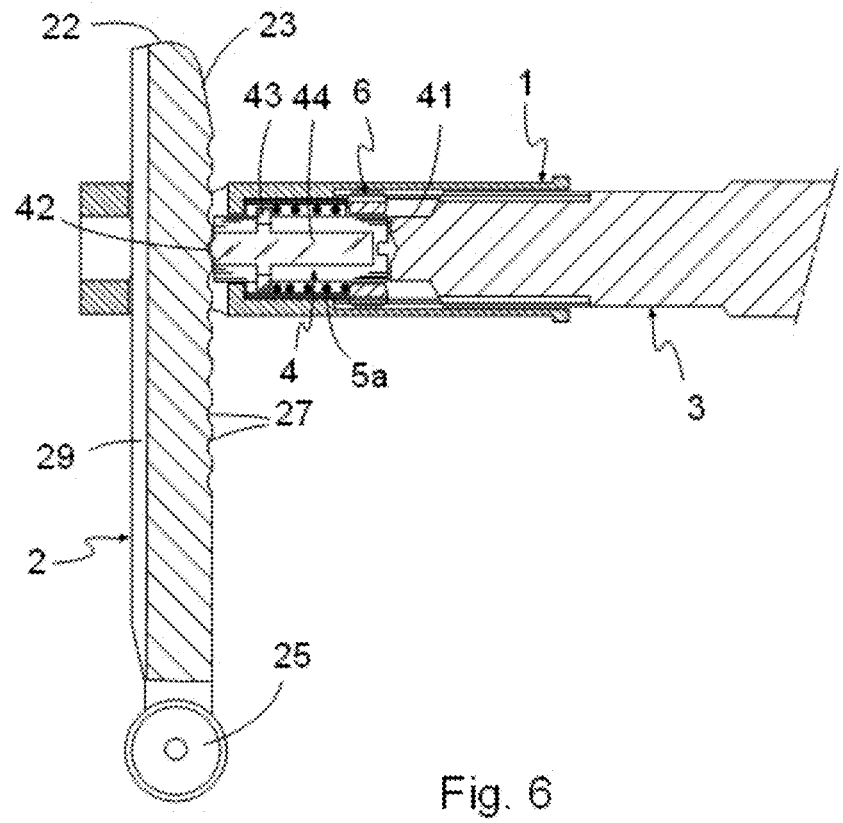
FIG. 6 shows an elevation view of the cutting device of FIG. 3 in mounted position, vertically cross-sectioned, and with the handle and stem in the front position for locking the cutting tool.
Figure 7:
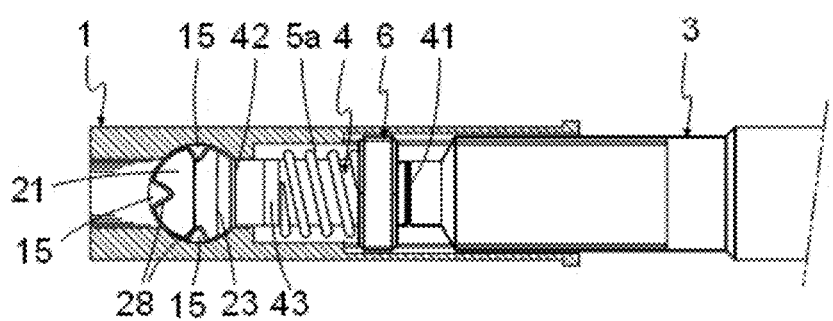
FIG. 7 corresponds to a plan view of the cutting device, with the support cross-sectioned by a horizontal plane, and with the stem and the handle in the same front position of FIG. 6.
Figure 8:
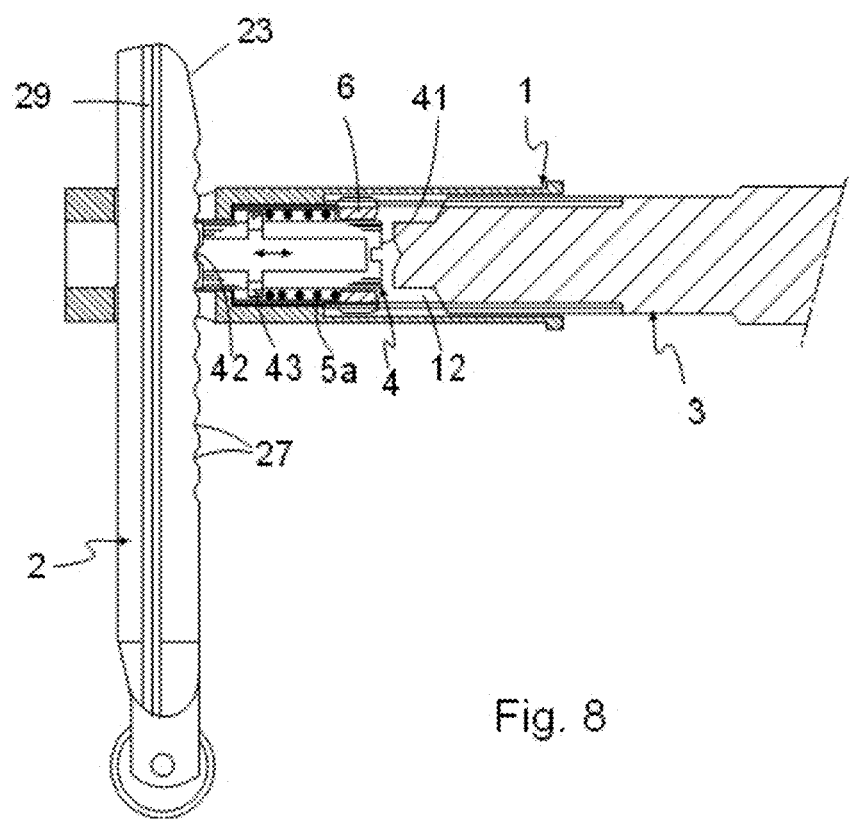
FIG. 8 shows a view similar to FIG. 6, with the handle in a rear position, in which it allows an alternative forward and backward movement of the stem, and the change of position in height of the cutting tool.

In the mounting position of the device, shown in FIGS. 6 to 8, the bar (21) of the cutting tool is accommodated through the vertical hole (11); acting against the front face (26) of said bar (21) the stem (4) that is accommodated in the horizontal hole (12) of the support (1) capable of longitudinal movement and uncapable of rotation and with the intermediate thickening (43) facing a front stop (14) of the support (1); said stem (4) being pushed in the forward direction by the spring (5a).

To prevent its rotation inside the support (1), the stem has lateral planes (44) parallel to other lateral planes (16) represented in FIG. 3 and defined in a hole of the support (1) that connects the horizontal hole (12) with the vertical hole (11) and through which said stem (4) accesses the interior of the vertical hole (11) to act with its front end against the front face (26) of the cutting tool (2).

In said mounting position, the rear end (41) of the stem is mounted through the interior hole of the annular stop (6).

The spring (5a) for pushing the stem (4) is mounted around said stem (4) and comprises: a front end that acts against the rear surface of the intermediate thickening (43) of the stem and a front end that acts against a front surface of the annular stop (6). The threaded mounting of the annular stop (6) in the support (1) that allows its position to be changed and consequently the push force transmitted by the spring (5a) to the stem (4) in the forward direction.

FIGS. 6 and 7 show the device of the invention in a locking position of the cutting tool (2). In said locked position, the handle (3) that is threaded mounted into the support (1) acts with its front end against the rear end (41) of the stem, preventing its backward movement and ensuring that the projection (42) remains accommodated in one of the recesses (27) preventing any vertical movement of the cutting tool.

In the unlocked position of the cutting tool (2), shown in FIG. 8, the handle (3) is spaced apart from the rear end (41) of the stem (4), which allows said stem (4) to perform alternate forward and backward movements.

In this unlocked position, the front end of the stem (4) acts, due to the push force of the spring (5a), against the front face (26), making it necessary to hold the cutting tool with the hand while its position in height is adjusted.

When the cutting tool is moved vertically to modify its position in height, the stem (4) performs forward and backward movements, as its projection (42) comes out of a recess (27) in the bar of the cutting tool and is accommodated in the following recess (27).

The function of the inclined ramp (23), defined at the first end (22) of the bar (21), is to facilitate the initial assembly of the cutting tool in the vertical hole (11) of the support (1), through its progressive actuation against the front end of the stem (4) and the initial backward movement of said stem (4) overcoming the push force of the spring (5a).

Figure 9:
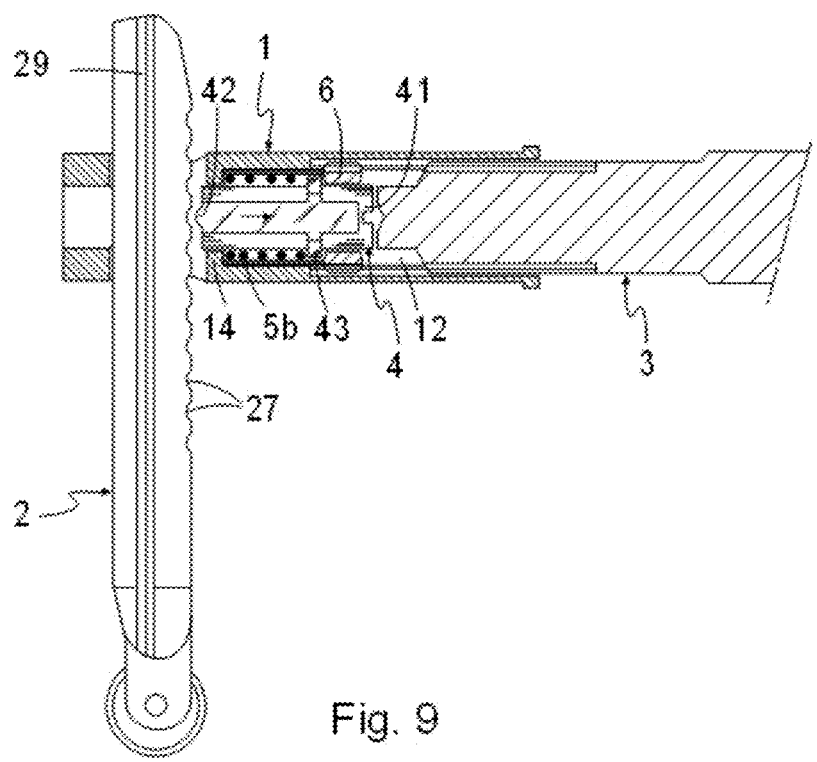
FIG. 9 shows an elevation view of a variant embodiment of the cutting device, which comprises a spring in the horizontal hole that moves the stem towards a rear position for releasing the cutting tool, and in which the stem has been represented in said rear position.
Figure 10:
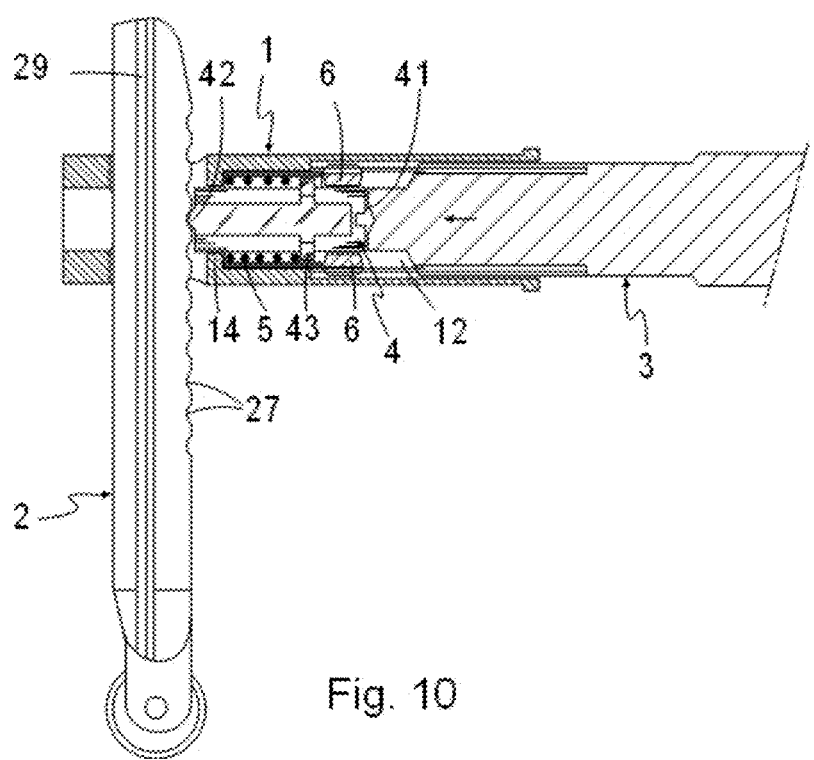
FIG. 10 shows a view similar to FIG. 9, with the stem and the handle in a front position for locking the cutting tool.

In the embodiment variant shown in FIGS. 9 and 10, the spring (5b), accommodated in the horizontal hole (12) of the support (1), moves the stem (4) towards a rear position for releasing the cutting tool (2), shown in FIG. 9.

As shown in FIG. 10, for the fixation of the cutting tool (2) it is enough to move the stem (4) by means of the handle (3) towards the front locking position.

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A cutting device for manual ceramic-cutting machines, comprising:
  a support provided with a horizontal hole with one threaded rear section on which a handle is mounted and a vertical hole that receives a cutting tool, the cutting tool comprising a bar provided with:
  a first end accommodated through the vertical hole of the support, a second end carrying a cutting wheel for marking a break line in ceramic pieces to be cut and a front face facing the horizontal hole of the support;
  a stem housed in the horizontal hole of the support capable of longitudinal movement between: a front position for locking the cutting tool and a rear position for releasing the cutting tool;
  a front face of the bar of the cutting tool comprises at least one row of adjacent recesses spaced apart vertically, and a front end of the stem comprises at least one projection which, in the front position for locking the cutting tool by means of the stem, the at least one projection is accommodated in one of the recesses of the front face of the bar of the cutting tool;
  wherein the stem comprises an intermediate thickening arranged between a front stop of the support and an annular stop, the annular stop being threadedly mounted into the threaded rear section of the support to adjust the position of the annular stop; and
  wherein the cutting device further comprises a spring, the spring arranged inside the horizontal hole of the support and configured to push the stem towards the front position to lock the cutting tool and to push the stem towards the rear position to release the cutting tool;
  wherein a height position of the cutting tool is configured to be adjusted by the handle moving towards the rear section such that the cutting tool moves vertically, as the spring maintains pressure of the at least one projection of the front end of the stem against the bar, and the stem undergoes alternating forward and backward movements as the at least one projection jumps over successive front recesses of the cutting tool bar when subjected to pushing.

2. The device according to claim 1, wherein the stem comprises a rear end facing a front end of the handle, and said handle is mounted on the support capable of movement between: a rear position which allows a backward movement of the stem, and a front position in which said handle acts against the rear end of the stem preventing the backward movement and fixing the stem in the front position for locking the cutting tool.

3. The device according to claim 1, wherein a first end of the bar of the cutting tool comprises a ramp inclined towards the front face of the bar.

4. The device according to claim 1, wherein the spring for pushing the stem towards the front position is mounted between the intermediate thickening of the stem and the annular stop.

5. The device according to claim 1, wherein the spring for pushing the stem towards the rear position is mounted between the front stop of the support and the intermediate thickening of the stem.

6. The device according to claim 1, wherein the annular stop, adjustable in position, comprises an interior hole for longitudinal guidance of the rear end of the stem.

7. The device according to claim 1, wherein the adjacent recesses spaced apart vertically have a length that coincides with the width of the front face of the bar facing the horizontal hole of the support.

8. The device according to claim 1, wherein the stem has lateral planes parallel to other lateral planes defined in a passage of the support that connects the horizontal hole with the vertical hole and through this passage of the support said stem accesses the interior of the vertical hole.

\* \* \* \* \*